US011752577B2

(12) United States Patent
Ko et al.

(10) Patent No.: US 11,752,577 B2
(45) Date of Patent: Sep. 12, 2023

(54) LASER APPARATUS AND SUBSTRATE ETCHING METHOD USING THE SAME

(71) Applicant: Samsung Display Co., Ltd., Yongin-Si (KR)

(72) Inventors: Yeonghwan Ko, Yongin-si (KR); Taekil Oh, Seoul (KR); Gyoowan Han, Yongin-si (KR); Jooseob Ahn, Hwaseong-si (KR); Yoongyeong Bae, Goyang-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 854 days.

(21) Appl. No.: 16/680,148

(22) Filed: Nov. 11, 2019

(65) Prior Publication Data

US 2020/0156187 A1 May 21, 2020

(30) Foreign Application Priority Data

Nov. 15, 2018 (KR) .................. 10-2018-0140998

(51) Int. Cl.
*B23K 26/36* (2014.01)
*B23K 26/06* (2014.01)
(Continued)

(52) U.S. Cl.
CPC ........ *B23K 26/362* (2013.01); *B23K 26/0604* (2013.01); *B23K 26/067* (2013.01); *B23K 26/0622* (2015.10); *B23K 26/0626* (2013.01); *B23K 26/0643* (2013.01); *B23K 26/0648* (2013.01); *B23K 26/0652* (2013.01);
(Continued)

(58) Field of Classification Search
None
See application file for complete search history.

(56) References Cited

U.S. PATENT DOCUMENTS 4,380,394 A   4/1983   Stowe
6,166,845 A   12/2000  Ito et al.
(Continued)

FOREIGN PATENT DOCUMENTS

CN   1983512 A    6/2007
CN   104174994 A  12/2014
(Continued)

OTHER PUBLICATIONS

Machine translation of Japan Patent No. 2002-280,322-A, Sep. 2022 (Year: 2022).*

(Continued)

*Primary Examiner* — Geoffrey S Evans
(74) *Attorney, Agent, or Firm* — Innovation Counsel LLP

(57) ABSTRACT

A laser apparatus may include a laser generator generating at least one a laser beam, which is used as an input light, an optical system converting the input light, which is provided from the laser generator, into a plurality of pattern lights, and a stage, on which a target object is loaded. The output light may be irradiated onto the target object. The optical system may divide the input light into a plurality of divided lights, and the pattern lights may be produced by constructive interference of the plurality of divided lights. A diameter of each of the pattern lights may be smaller than a diameter of the input light.

20 Claims, 13 Drawing Sheets

(51) Int. Cl.
*B23K 26/362* (2014.01)
*G02B 27/10* (2006.01)
*G02B 19/00* (2006.01)
*G02B 27/28* (2006.01)
*B23K 26/0622* (2014.01)
*B23K 26/073* (2006.01)
*B23K 26/067* (2006.01)

(52) U.S. Cl.
CPC ........ *B23K 26/0665* (2013.01); *B23K 26/073* (2013.01); *G02B 19/0009* (2013.01); *G02B 27/1093* (2013.01); *G02B 27/283* (2013.01)

(56) References Cited

U.S. PATENT DOCUMENTS

| | | | |
|---|---|---|---|
| 8,947,627 B2 | 2/2015 | Rappoport et al. | |
| 9,543,364 B2 | 1/2017 | Rappoport et al. | |
| 10,171,636 B2 | 1/2019 | Yeo et al. | |
| 2004/0155017 A1 | 8/2004 | Hunt et al. | |
| 2005/0194365 A1* | 9/2005 | Li | B82Y 30/00 219/121.61 |
| 2006/0127405 A1* | 6/2006 | Ichikawa | A61P 17/00 536/23.53 |
| 2006/0237405 A1 | 10/2006 | Hunt et al. | |
| 2007/0141482 A1 | 6/2007 | Kim et al. | |
| 2014/0076869 A1* | 3/2014 | Lee | B23K 26/0648 219/121.75 |
| 2016/0167165 A1* | 6/2016 | Roch | B23K 26/0648 219/121.75 |
| 2016/0265570 A1* | 9/2016 | Sabau | C09J 5/02 |
| 2017/0087664 A1* | 3/2017 | Cho | G02B 27/286 |
| 2020/0070280 A1* | 3/2020 | Gauch | H01S 3/005 |

FOREIGN PATENT DOCUMENTS

| | | | | |
|---|---|---|---|---|
| CN | 106624354 A | * | 5/2017 | ......... B23K 26/0643 |
| EP | E P-2431120 A1 | * | 3/2012 | ......... B23K 26/0006 |
| JP | 109248686 A | | 9/1997 | |
| JP | H11-337589 A | | 12/1999 | |
| JP | 2002280322 A | * | 9/2002 | |
| JP | 2002-335063 A | | 11/2002 | |
| JP | 2003-048095 A | | 2/2003 | |
| JP | 2004-279140 A | | 10/2004 | |
| JP | 2009-288071 A | | 12/2009 | |
| KR | 10-0752831 B1 | | 8/2007 | |
| KR | 10-1570250 B1 | | 11/2015 | |
| KR | 10-2016-0127462 A | | 11/2016 | |
| KR | 10-2017-0112790 A | | 10/2017 | |
| KR | 10-2017-0121864 A | | 11/2017 | |
| WO | WO-2012107535 A1 | * | 8/2012 | ............. B23K 26/00 |
| WO | WO-2014103493 A1 | * | 7/2014 | ......... B23K 26/0084 |
| WO | WO-2017032818 A1 | * | 3/2017 | ......... B23K 26/0006 |

OTHER PUBLICATIONS

Machine translation of WO-2012107535-A1, Sep. 2022 (Year: 2022).*

Machine translation of WO-2014103493-A1, Sep. 2022 (Year: 2022).*

Machine translation of WO-2017032818-A1, Sep. 2022 (Year: 2022).*

Machine translation of CN-106624354-A, Jan. 2023.*

Chinese Office Action corresponding to Application No. 201911111208.X and dated Oct. 28, 2022, 8 pages.

Andr'es Fabi'an Lasagni, Tim Zunze, Teja Roch, Valentin Lang, Anne G''artner, Andreas Rank, Denise G''unther, and Matthias Bieda, "Efficient high-resolution surface patterning for 2D and 3D parts", SPIE, The international Society for Optics and Photonics (Mar. 29, 2016), 4 pages.

S. Indrišiūnas* B. Voisiat, A. Réza, I. Šimkienė, R. Mažeikienė, A. Selskis, G. Račiukaitis, "Influence of surface modification by laser beam interference ablation on characteristics of p-Si solar cells", Proceedings vol. 9180 (Oct. 8, 2014) https://doi.org/10.1117/12.2061727, 3 pages.

* cited by examiner

LASER APPARATUS AND SUBSTRATE ETCHING METHOD USING THE SAME

CROSS-REFERENCE TO RELATED APPLICATIONS

This U.S. non-provisional patent application claims priority under 35 U.S.C. § 119 to Korean Patent Application No. 10-2018-0140998, filed on Nov. 15, 2018, in the Korean Intellectual Property Office, the entire contents of which are hereby incorporated by reference.

BACKGROUND OF THE INVENTION

The present disclosure relates to a laser apparatus, and in particular, to a laser apparatus with an improved process precision and a substrate etching method.

Through an optical system, a laser apparatus is capable of emitting a laser beam from a light source onto a target object, and is used to perform various laser irradiation processes (e.g., marking, exposing, etching, punching, scribing, and dicing processes) on a target object. In the laser irradiation process, a wavelength, a beam size, and an intensity of the laser beam generated by the light source may be controlled to process the target object in different manners.

SUMMARY

An embodiment of the inventive concept provide a laser apparatus with an improved process precision and a method of etching a substrate using the same.

According to an embodiment of the inventive concept, a laser apparatus may include a laser generator generating at least one input light, wherein the input light is laser beam, an optical system converting the input light, which is provided from the laser generator, into an output light including a plurality of pattern lights, and a stage, on which a target object is loaded. The output light may be irradiated onto the target object. The optical system may divide the input light into a plurality of divided lights, the pattern lights may be produced by constructive interference of the plurality of divided lights, and a diameter of each of the pattern lights may be smaller than a diameter of the input light.

In an embodiment, the diameter of each of the pattern lights may be smaller than or equal to about 1 μm.

In an embodiment, the optical system may include a light dividing part configured to divide light that is incident thereto into the divided lights, and a light condensing part disposed behind the light dividing part on an optical path and configured to condense the divided lights.

In an embodiment, the light dividing part may include a diffraction optical element (DOE) that is configured to divide the incident light into the plurality of divided lights through diffraction of the incident light.

In an embodiment, the light condensing part may include at least one lens.

In an embodiment, the optical system may further include a first processing part disposed behind the light condensing part on the optical path and configured to convert each of the condensed lights to a parallel light.

In an embodiment, the optical system may further include a second processing part disposed behind the light condensing part on the optical path and configured to change a shape and a size of the lights that are condensed by the light condensing part.

In an embodiment, the light condensing part may include a material having a refractive index anisotropy.

In an embodiment, at least two lights of the divided lights, which are divided by the light dividing part, may be different from each other in terms of phase retardation values of specific components thereof.

In an embodiment, the optical system may include a plurality of beam splitters, each of which are configured to transmit or reflect an incident light and divides the incident light into lights propagating in an x direction and in a y direction crossing the x direction, a plurality of mirrors configured to reflect a light propagating in the y direction, among the lights divided by the beam splitter, and at least one phase retarder disposed between the beam splitter and the mirror on an optical path and configured to retard a phase of a component of the incident light.

In an embodiment, the phase retarder may include a quarter wave plate configured to retard a component of the incident light by $\lambda/4$, where $\lambda$ is a wavelength of the incident light.

In an embodiment, the optical system may include a first beam splitter configured to divide the input light, which propagates along a first path, into lights propagating along a second path parallel to an x direction and along a third path parallel to a y direction crossing the x direction, a first mirror disposed on the third path, a second mirror disposed on a fourth path to face the first mirror, the fourth path being parallel to the third path and being connected to the third path by the first beam splitter, a second beam splitter disposed on the third path, the second beam splitter configured to divide a light, which propagates along the third path, into lights propagating along a fifth path, which is parallel to the x direction and is directed toward the stage, and along a sixth path, which is parallel to the y direction, a third mirror disposed on the sixth path, and a fourth mirror disposed on a seventh path to face the third mirror, the seventh path being parallel to the sixth path and being connected to the sixth path by the second beam splitter.

In an embodiment, the optical system may further include a first phase retarder, which is disposed between the first beam splitter and the first mirror on the third path and configured to retard a phase of a component of an incident light, and a second phase retarder, which is disposed between the second beam splitter and the third mirror on the sixth path and configured to retard a phase of a component of an incident light.

In an embodiment, the optical system may further include a third phase retarder, which is disposed between the first beam splitter and the second mirror on the fourth path and configured to retard a phase of a component of an incident light, and a fourth phase retarder, which is disposed between the second beam splitter and the fourth mirror on the seventh path and configured to retard a phase of a component of an incident light.

In an embodiment, the beam splitter may be a polarization beam splitter, which is configured to transmit or reflect an incident light, depending on a polarization state of the incident light.

In an embodiment, the input light may be a linearly-polarized light.

According to an embodiment of the inventive concept, a method of etching a substrate may include preparing a target substrate, dividing an input light into a plurality of divided lights, making a phase difference between the divided lights, mixing the divided lights to form an output light, and etching the target substrate using the output light. In the forming of the output light, the divided lights may be constructively interfered with each other to form a plurality of pattern lights constituting the output light. A diameter of each of the pattern lights may be smaller than a diameter of the input light.

In an embodiment, the diameter of each of the pattern lights may be smaller than or equal to about 1 µm.

In an embodiment, in the dividing of the input light, the input light may be divided into the plurality of divided lights through diffraction of the input light.

In an embodiment, in the dividing of the input light, the input light may be divided into the plurality of divided lights, depending on a polarization state of the input light.

BRIEF DESCRIPTION OF THE DRAWINGS

Example embodiments will be more clearly understood from the following brief description taken in conjunction with the accompanying drawings. The accompanying drawings represent non-limiting, example embodiments as described herein.

Figure 1:
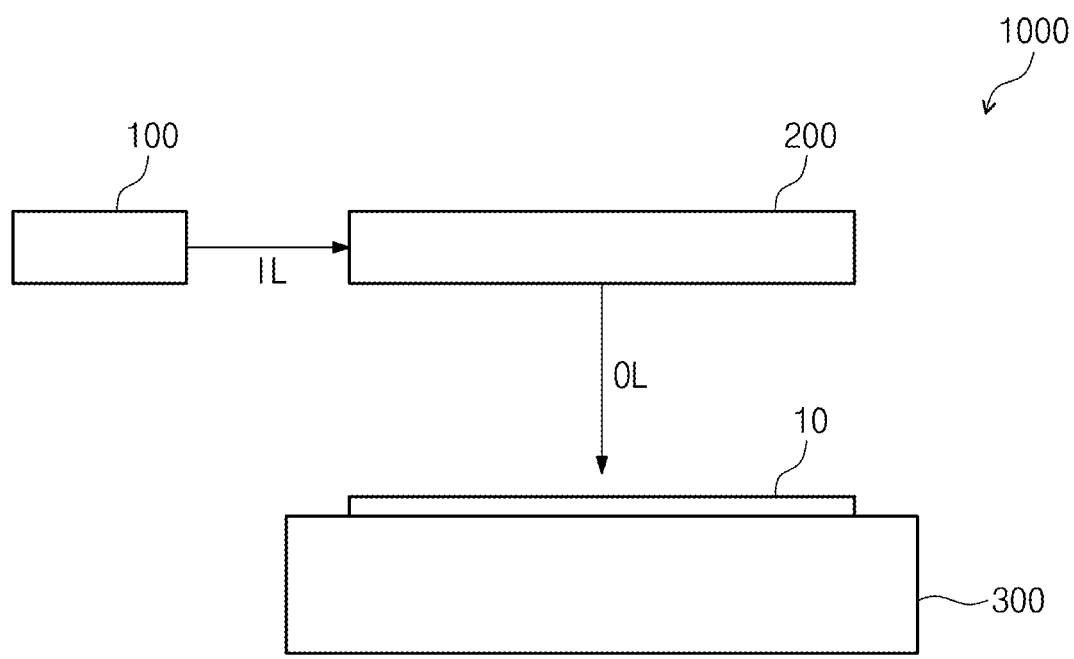
FIG. 1 is a schematic diagram illustrating a laser apparatus according to an embodiment of the inventive concept.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative thicknesses and positioning of molecules, layers, regions and/or structural elements may be reduced or exaggerated for clarity. The use of similar or identical reference numbers in the various drawings is intended to indicate the presence of a similar or identical element or feature.

DETAILED DESCRIPTION

Example embodiments of the inventive concepts will now be described more fully with reference to the accompanying drawings, in which example embodiments are shown. Example embodiments of the inventive concepts may, however, be embodied in many different forms and should not be construed as being limited to the embodiments set forth herein; rather, these embodiments are provided so that this disclosure will be thorough and complete, and will fully convey the concept of example embodiments to those of ordinary skill in the art. In the drawings, the thicknesses of layers and regions are exaggerated for clarity. Like reference numerals in the drawings denote like elements, and thus their description will be omitted.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Like numbers indicate like elements throughout. As used herein the term "and/or" includes any and all combinations of one or more of the associated listed items. Other words used to describe the relationship between elements or layers should be interpreted in a like fashion (e.g., "between" versus "directly between," "adjacent" versus "directly adjacent," "on" versus "directly on").

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises", "comprising", "includes" and/or "including," if used herein, specify the presence of stated features, integers, steps, operations, elements and/or components, but do not preclude the presence or addition of one or more other features, integers, steps, operations, elements, components and/or groups thereof.

Example embodiments of the inventive concepts are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments of the inventive concepts should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which example embodiments of the inventive concepts belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

FIG. 1 is a schematic diagram illustrating a laser apparatus according to an embodiment of the inventive concept.

Referring to FIG. 1, a laser apparatus 1000 according to an embodiment of the inventive concept may include a laser generator 100, an optical system 200, and a stage 300.

The laser generator 100 may generate an input light IL. The input light IL may be a laser beam. The input light IL may be used for an etching process. The inventive concept is not limited to a specific wavelength band of the input light IL. For example, the input light IL may be a green light whose wavelength ranges from about 340 nm to 550 nm. In an embodiment, the input light IL may be an infrared light.

The optical system 200 may convert the input light IL, which is provided from the laser generator 100, to at least one output light OL. When viewed in an optical path from the laser generator 100 to the stage 300, the optical system 200 may be disposed between the stage 300 and the laser generator 100 and to allow the at least one output light OL to propagate toward the stage 300.

In the present embodiment, an example in which the laser apparatus 1000 includes one optical system 200 will be described, but the inventive concept is not limited to this example. In an embodiment, the laser apparatus 1000 may further include a plurality of optical systems (not shown), which is independent of the optical system 200 to be described below.

Hereinafter, the optical system 200 will be described in more detail with reference to FIGS. 2 and 3.

The stage 300 may support a target object 10. The stage 300 may provide a flat surface. Although not shown in the drawings, the laser apparatus 1000 may further include a stage driving part (not shown), which is disposed below or near the stage 300 and is used to change a position of the stage 300.

The output light OL emitted from the optical system 200 may be irradiated onto the target object 10 loaded on the stage 300. The laser apparatus 1000 may be used for an etching or cutting process. In other words, the output light OL may be used to etch or cut at least a partial region of the target object 10.

Although not shown in the drawings, the laser apparatus 1000 may further include at least one direction changing member (not shown), which is disposed on the optical path and between the optical system 200 and the stage 300. As an example, the direction changing member may be a galvanometer scanner or a mirror. The direction changing member may change a propagation direction of the output light OL such that the output light OL provided from the optical system 200 propagates toward the stage 300.

Figure 2:
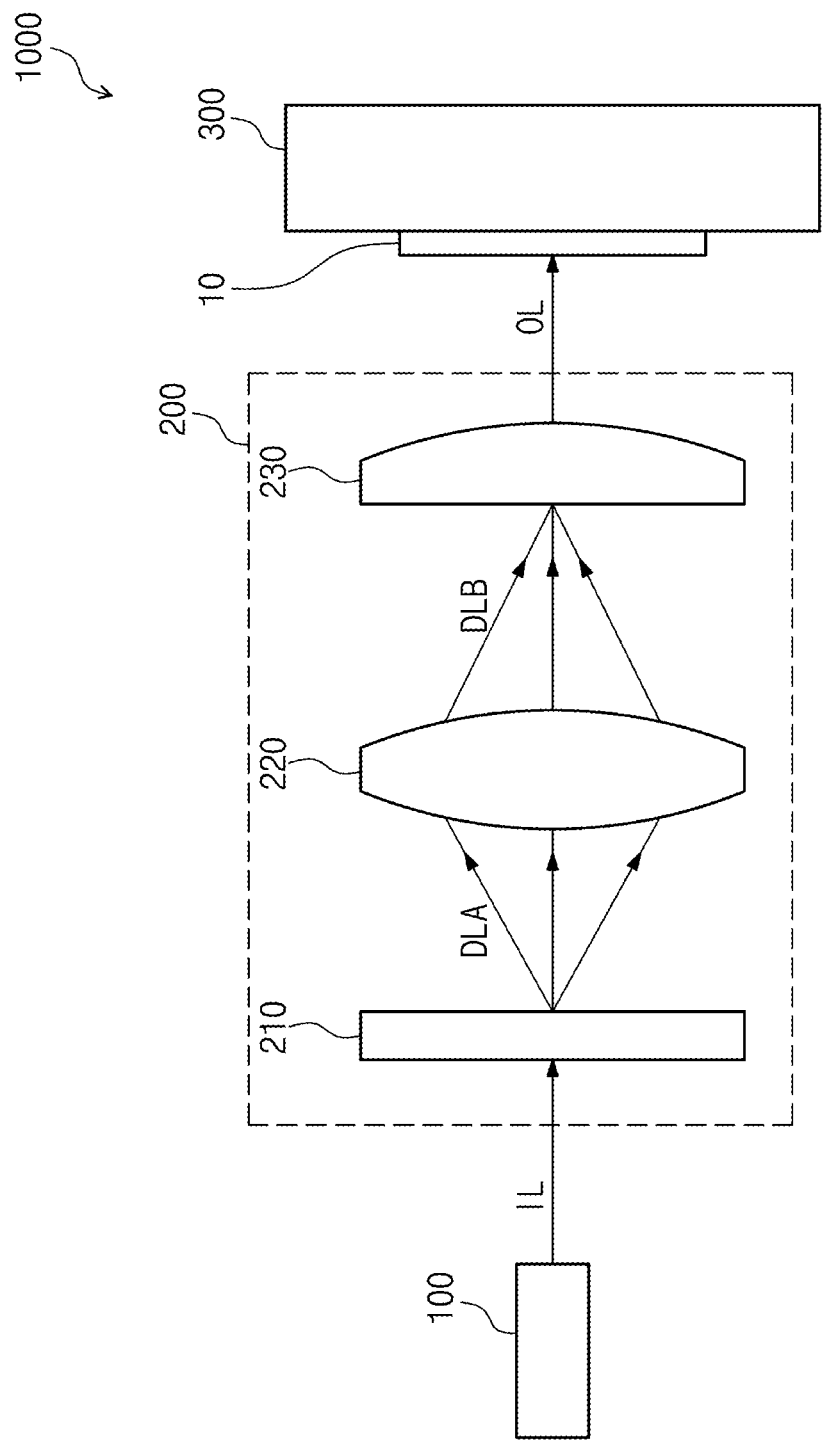
FIG. 2 is a schematic diagram of an optical system of FIG. 1.

FIG. 2 is a schematic diagram of an optical system of FIG. 1.

Referring to FIG. 2, the optical system 200 may include a light dividing part 210, a light condensing part 220, and a first processing part 230.

The light dividing part 210 may divide the input light IL into a plurality of divided lights DLA. In the present embodiment, the light dividing part 210 may divide the input light IL into at least three divided lights DLA.

In an embodiment, the light dividing part 210 may be configured to cause diffraction of the input light IL. As an example, the light dividing part 210 may be or include a diffraction optical element (DOE).

The light condensing part 220 may be disposed behind the light dividing part 210, on the optical path. The light condensing part 220 may be configured to condense the divided lights DLA incident thereto. For example, the light condensing part 220 may refract the divided lights DLA incident thereto. Divided lights DLB, which are refracted by the light condensing part 220, may propagate toward a specific convergence point. The divided lights DLB may be mixed by the light condensing part 220. In other words, the divided lights DLB may be at least partially overlapped with each other.

The light condensing part 220 may include at least one lens. FIGS. 2 and 3 illustrate an example, in which the light condensing part 220 is provided in the form of a single convex lens. However, the inventive concept is not limited to the kind and the number of the lens constituting the light condensing part 220.

The first processing part 230 may be disposed behind the light condensing part 220 on the optical path. The first processing part 230 may be configured to convert the lights, which are incident thereto, to parallel light. A propagation direction of the parallel light may be perpendicular to a top surface of the stage 300. As an example, the first processing part 230 may be a collimator.

In the present embodiment, the first processing part 230 may be disposed at a point, on which the divided lights DLB emitted from the light condensing part 220 are converged. For example, the first processing part 230 may be disposed at a focal point of the light condensing part 220. Thus, the divided lights DLB concentrated by the light condensing part 220 may be converted to the parallel light by the first processing part 230. The divided lights DLB, whose propagation directions are changed to be parallel to each other by the first processing part 230, will be referred to as the output light OL.

In an embodiment, the first processing part 230 may be omitted. In this case, a focal point of the light condensing part 220 may be placed on the target object 10.

Figure 3:
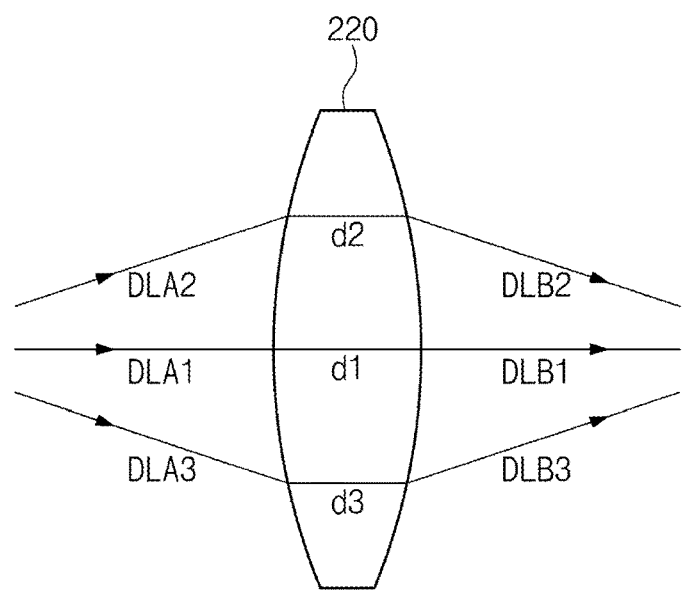
FIG. 3 is a diagram illustrating optical paths of lights passing through a light condensing part of FIG. 2.

FIG. 3 is a diagram illustrating optical paths of lights passing through a light condensing part of FIG. 2. For convenience in illustration, only three divided lights of the plurality of the divided lights DLA and DLB split by the light dividing part 210 are illustrated in FIG. 3.

Referring further to FIG. 3, the light condensing part 220 according to an embodiment of the inventive concept may have a refractive index anisotropy. In other words, the light condensing unit 220 may cause a retardation of the phase of at least one of the light transmitted through the light condensing unit 220.

Furthermore, according to an embodiment of the inventive concept, lights passing through the light condensing part 220 may have at least partially different phases.

In detail, first to third divided lights DLA1-DLA3 provided from the light dividing part 210 may pass through the light condensing part 220. In an internal space of the light condensing part 220, the first to third divided lights DLA1-DLA3 may propagate along optical paths having different path lengths. A phase retardation value of each of the first to third divided lights DLA1-DLA3 may be in proportion to the path length of the optical path. The first divided light DLA1 may propagate along an optical path of a first distance d1, in the internal space of the light condensing part 220. The second divided light DLA2 may propagate along an optical path of a second distance d2, in the internal space of the light condensing part 220. The third divided light DLA3 may propagate along an optical path of a third distance d3, in the internal space of the light condensing part 220. The first distance d1, the second distance d2, and the third distance d3 may be different from each other. Divided lights DLB1-DLB3, which pass through the light condensing part 220 but have different phase retardation values, may be refracted at an interface of the light condensing part 220 and may be concentrated.

Although not shown in the drawings, in an embodiment, the optical system 200 may further include an additional phase retarder (not shown), which is disposed between the light dividing part 210 and the first processing part 230 and on the optical path. The phase retarder may have a refractive index anisotropy. The phase retarder may increase a difference in phase between lights propagating along different paths.

Figure 4:
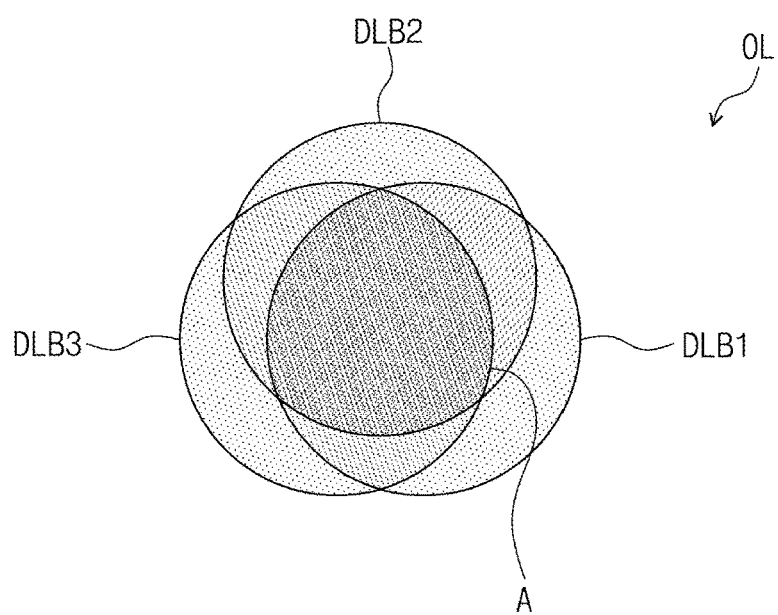
FIG. 4 is a cross-sectional view illustrating an output light according to an embodiment of the inventive concept.

FIG. 4 is a cross-sectional view illustrating an output light according to an embodiment of the inventive concept.

Referring to FIG. 4, the output light OL may have a beam section, in which the divided lights DLB1-DLB3 are partially mixed. In the present embodiment, interference may occur in a region, in which the divided lights DLB1-DLB3 are overlapped with each other.

In detail, since the divided lights DLB1-DLB3 have different phase retardation values, the interference may occur in the overlapping region of the divided lights DLB1-DLB3. In the case where the divided lights DLB1-DLB3 constructively interfere with each other in a specific region, the output light OL may have a plurality of patterns in the specific region. For example, in the case where two divided lights are overlapped with each other, the output light OL may have a stripe shape, and in the case where three or more divided lights are overlapped to each other, the output light OL may have a matrix shape. A region 'A' shown in FIG. 4 may be defined as a region in which all of the first to third divided lights DLB1-DLB3 are overlapped with each other.

Figure 5:
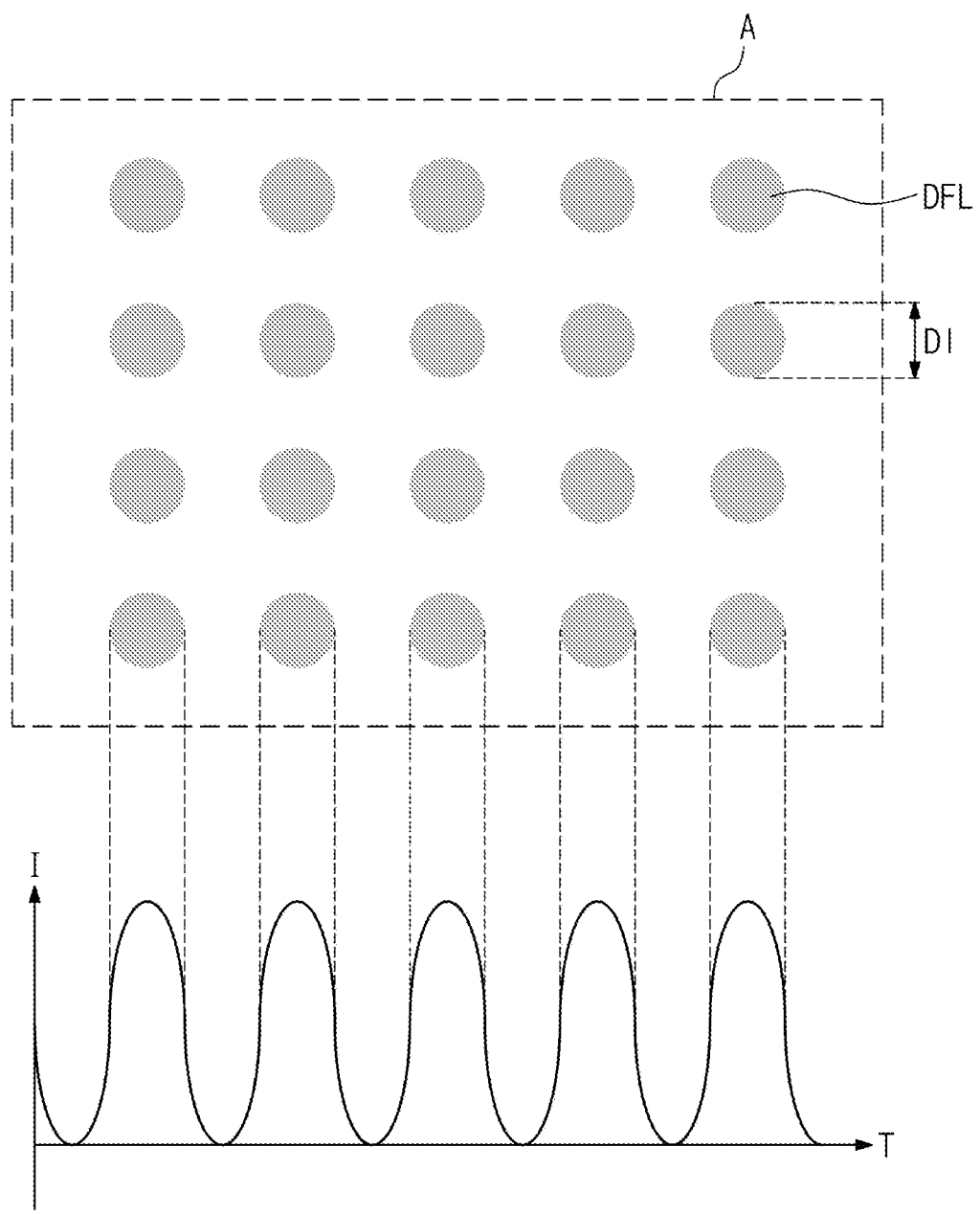
FIG. 5 is an enlarged view of a region 'A' of FIG. 4.

FIG. 5 is an enlarged view of the region 'A' of FIG. 4.

Referring further to FIG. 5, the output light OL may include a plurality of pattern lights DFL, which are provided to form a matrix-shaped arrangement in the region 'A'. The arrangement of the pattern lights DFL may be constructed by the constructive interference between the first to third divided lights DLB1-DLB3. Thus, the pattern lights DFL may be regularly arranged in the region 'A'.

According to an embodiment of the inventive concept, the input light IL having a relatively large diameter may be converted into a plurality of the pattern lights DFL, each of which has a relatively small diameter. The pattern lights DFL may have a first diameter DI of about 1 μm or less.

Figure 6:
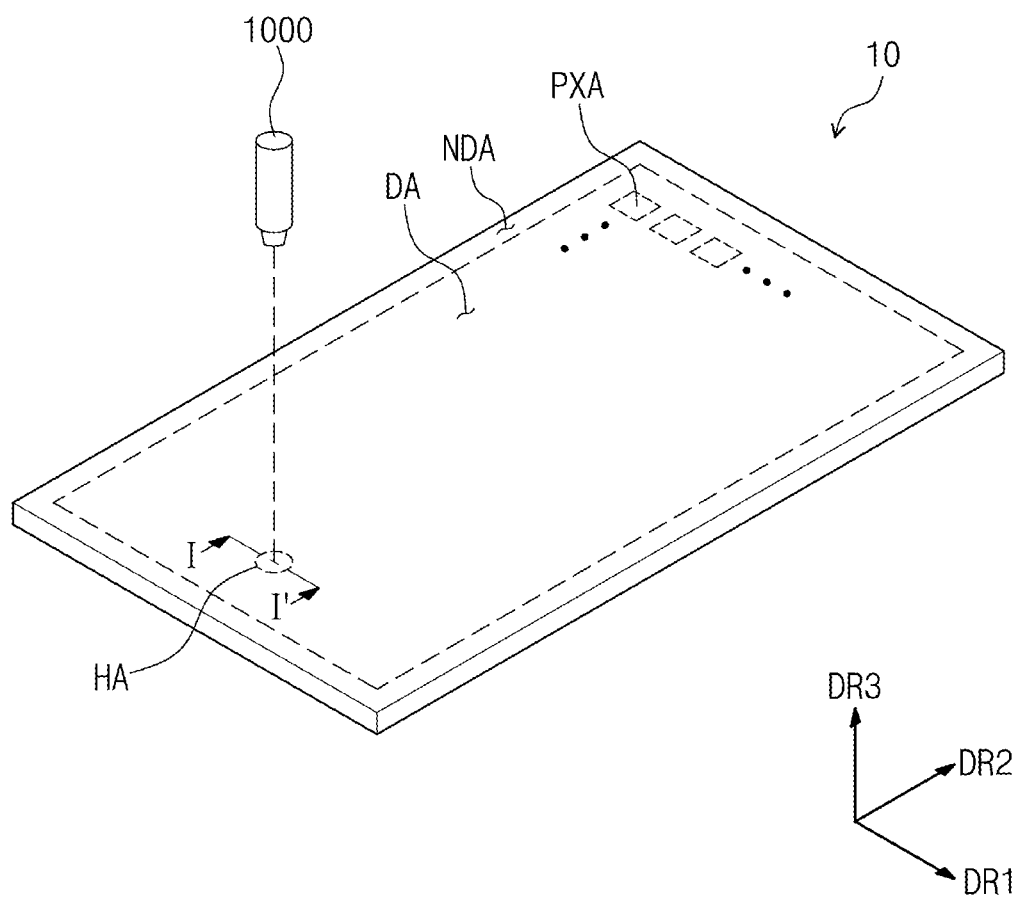
FIG. 6 is a perspective view illustrating a target object according to an embodiment of the inventive concept.
Figure 7:
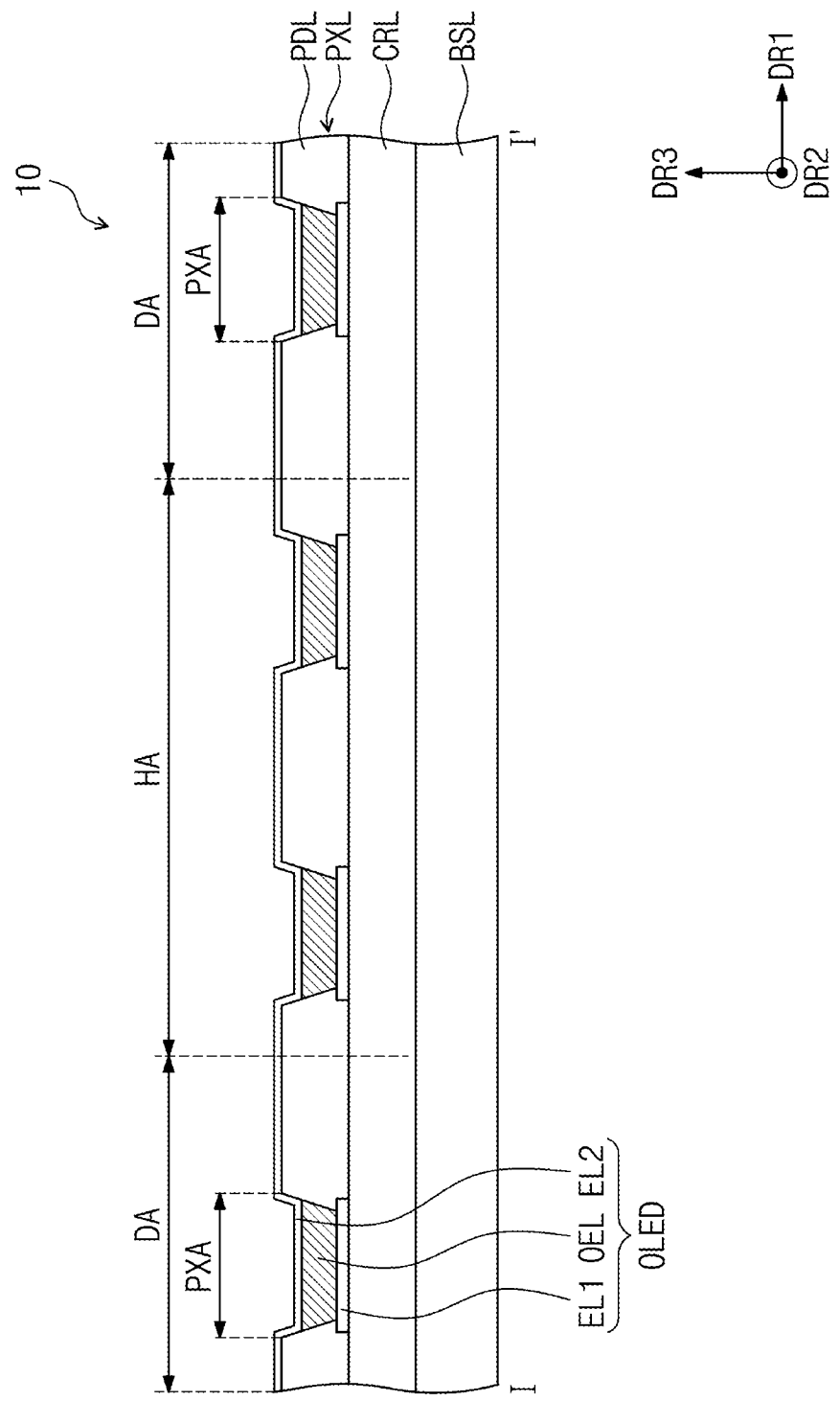
FIG. 7 is a sectional view taken along a line I-I' of FIG. 6.

FIG. 6 is a perspective view illustrating a target object according to an embodiment of the inventive concept, and FIG. 7 is a sectional view taken along a line I-I' of FIG. 6.

Referring to FIGS. 6 and 7, the target object 10 according to an embodiment of the inventive concept may be a rectangular substrate structure, whose short side is parallel to a first direction DR1 and whose long side is parallel to a second direction DR2, which is perpendicular to the first direction DR1 in a plan view. A plane defined by the first and second directions DR1 and DR2 may be parallel to a top surface of the stage 300.

The target object 10 may be a display substrate 10 constituting a display panel. In detail, when viewed in a plan view, a display region DA and a non-display region NDA may be defined in the target object 10. The display region DA may include a plurality of pixel regions PXA displaying an image. The pixel regions PXA may be arranged in a matrix shape, when viewed in a plan view.

As described above, the laser apparatus 1000 may be used to cut or etch a region of the target object 10. As an example, the laser apparatus 1000 may be used to etch a hole region HA enclosed by the display region DA. Although FIG. 6 illustrates an example of the hole region HA, which is formed at an off-centered position of the display region DA in the second direction DR2, the inventive concept is not limited to a position of the hole region HA.

The display substrate 10 may include a base layer BSL, a circuit layer CRL, and a pixel layer PXL.

The base layer BSL may define a rear surface of the display substrate 10. The base layer BSL may be an underlying layer, on which electrodes and display elements constituting the display substrate 10 are formed. The base layer BSL may be provided in the form of a substrate.

According to an embodiment of the inventive concept, the type of display that the display substrate 10 (i.e., the display panel) is may be determined by the structure of the circuit layer CRL and the pixel layer PXL. FIG. 7 illustrates an example of the display substrate 10, which can be used for an organic light emitting display panel.

The circuit layer CRL may be disposed on the base layer BSL. The circuit layer CRL may include a plurality of thin film transistors (not shown) and a plurality of signal lines (not shown), which are used to drive organic light emitting elements OLED.

The pixel layer PXL may be disposed on the circuit layer CRL. The pixel layer PXL may include a plurality of organic light emitting elements OLED and a pixel definition layer PDL, which delimits or sections the organic light emitting elements OLED. In the pixel layer PXL, each organic light emitting element OLED and at least one thin film transistor (not shown) of the circuit layer CRL connected to the organic light emitting element OLED may define one pixel.

Each of the organic light emitting elements OLED may include a first electrode EL1, a light emitting layer OEL, and a second electrode EL2. The first electrode EL1 may be disposed on the circuit layer CRL and may be electrically connected to the at least one thin film transistors (not shown) of the circuit layer CRL. The first electrode EL1 may be exposed by the pixel definition layer PDL. The light emitting layer OEL may be disposed on the first electrode EL1 and in a region delimited by the pixel definition layer PDL. The second electrode EL2 may cover the pixel definition layer PDL and the light emitting layer OEL.

Figure 8:
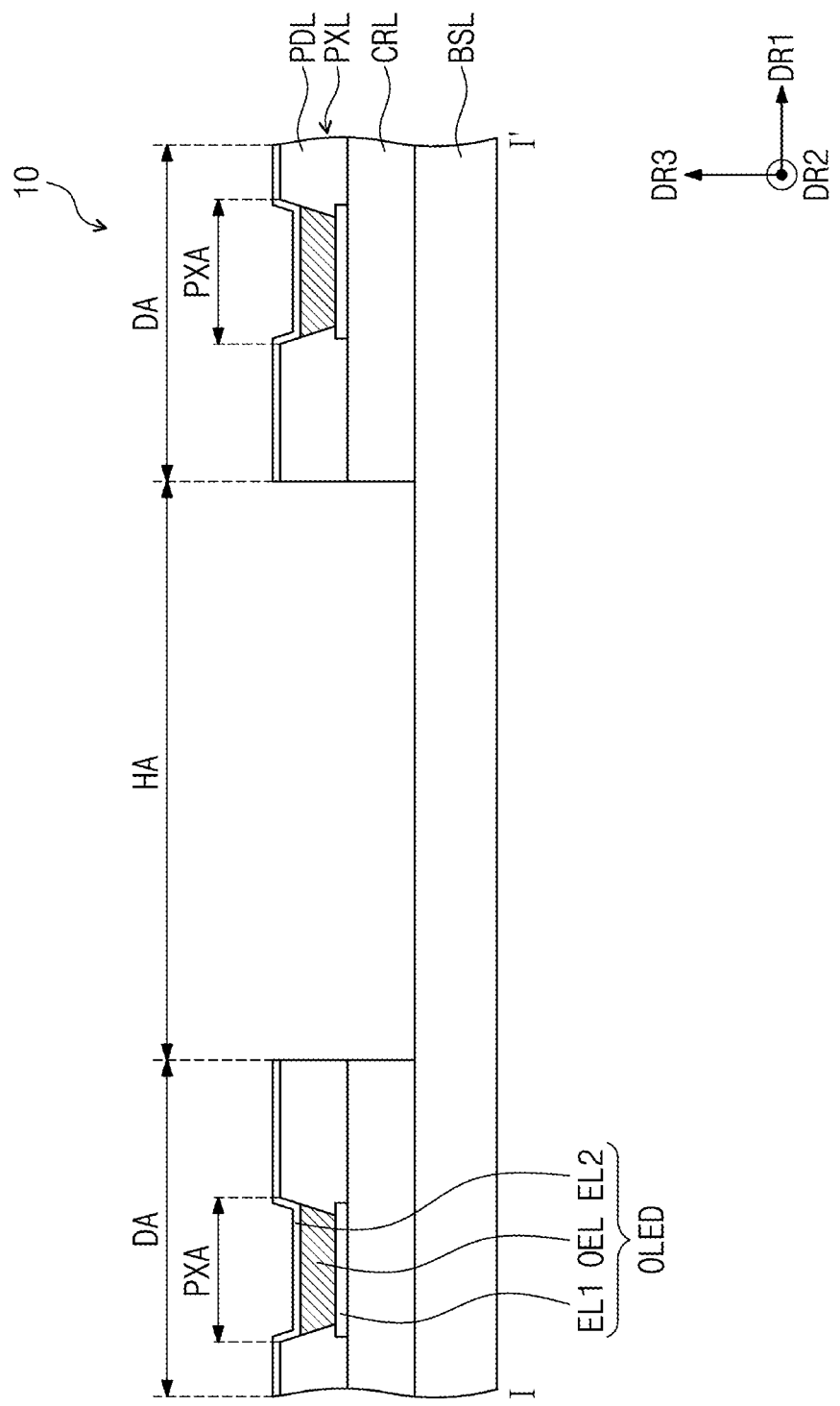
FIG. 8 is a sectional view illustrating a target object after an etching process.

FIG. 8 is a sectional view illustrating a target object after an etching process.

Referring to FIG. 8, the laser apparatus 1000 may be used to etch at least a portion of the circuit and pixel layers CRL and PXL, which are overlapped with the hole region HA, of the display substrate 10.

In the case where, unlike the embodiment of the inventive concept, the output light OL having a relatively large diameter is used to etch the display substrate 10, relatively large burr (not shown), e.g., a rough edge, may be formed around the hole region HA. In this case, the display region DA may have an uneven structure near the hole region HA. This may lead to process failure in back-end steps (e.g., of bonding the display substrate 10 with an encapsulation substrate) of a process of fabricating a display panel. By contrast, according to an embodiment of the inventive concept, since the output light OL includes a plurality of the pattern lights DFL, each of which has a relatively small diameter (e.g., see FIG. 5), it may be possible to reduce a size of a burr, which is formed near the hole region HA during the etching process. Thus, according to an embodiment of the inventive concept, the etching process may be performed with improved precision, and a yield of a target object may be increased.

Figure 9:
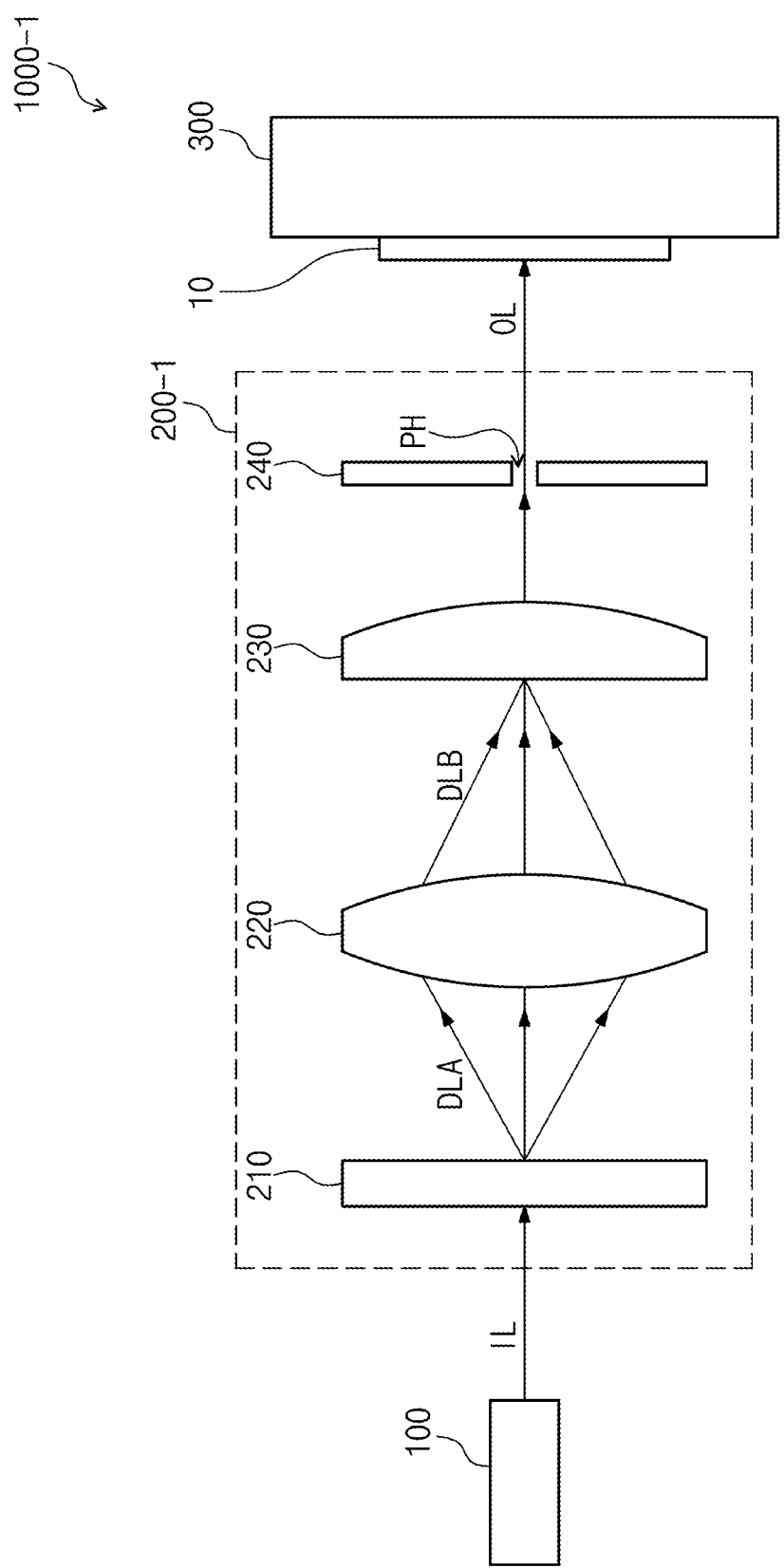
FIG. 9 is a schematic diagram illustrating an optical system according to other embodiment of the inventive concept.

FIG. 9 is a schematic diagram illustrating an optical system according to another embodiment of the inventive concept.

For concise description, a previously described element may be identified by a similar or identical reference number without repeating an overlapping description thereof. Other elements that are not separately described may be configured to have substantially the same technical features as those in the previously described embodiments.

Referring to FIG. 9, an optical system 200-1 of a laser apparatus 1000-1 according to the present embodiments may further include a second processing part 240.

The second processing part 240 may be disposed behind the first processing part 230 on the optical path.

The second processing part 240 may change a shape and a size of the output light OL, which is formed by partial overlapping of the divided lights DLB1-DLB3. As an example, the second processing part 240 may be or include a substrate-shaped structure, in which a pin-hole PH is formed on the optical path.

In detail, the pin-hole PH of the second processing part 240 may be formed to allow only a portion of a sectional region of the output light OL (in particular, the region 'A' (e.g., of FIG. 4) overlapped with all of the divided lights DLB1-DLB3), to pass therethrough. In other words, a region of the output light OL, which is not overlapped with the divided lights DLB1-DLB3 or is overlapped with only two divided lights, may be absorbed by the second processing part 240.

The inventive concept is not limited to a specific shape of the pin-hole PH.

In the present embodiment, since the output light OL, which is incident onto the target object 10, includes only the pattern lights DFL with a small diameter, the process precision may be improved.

Figure 10:
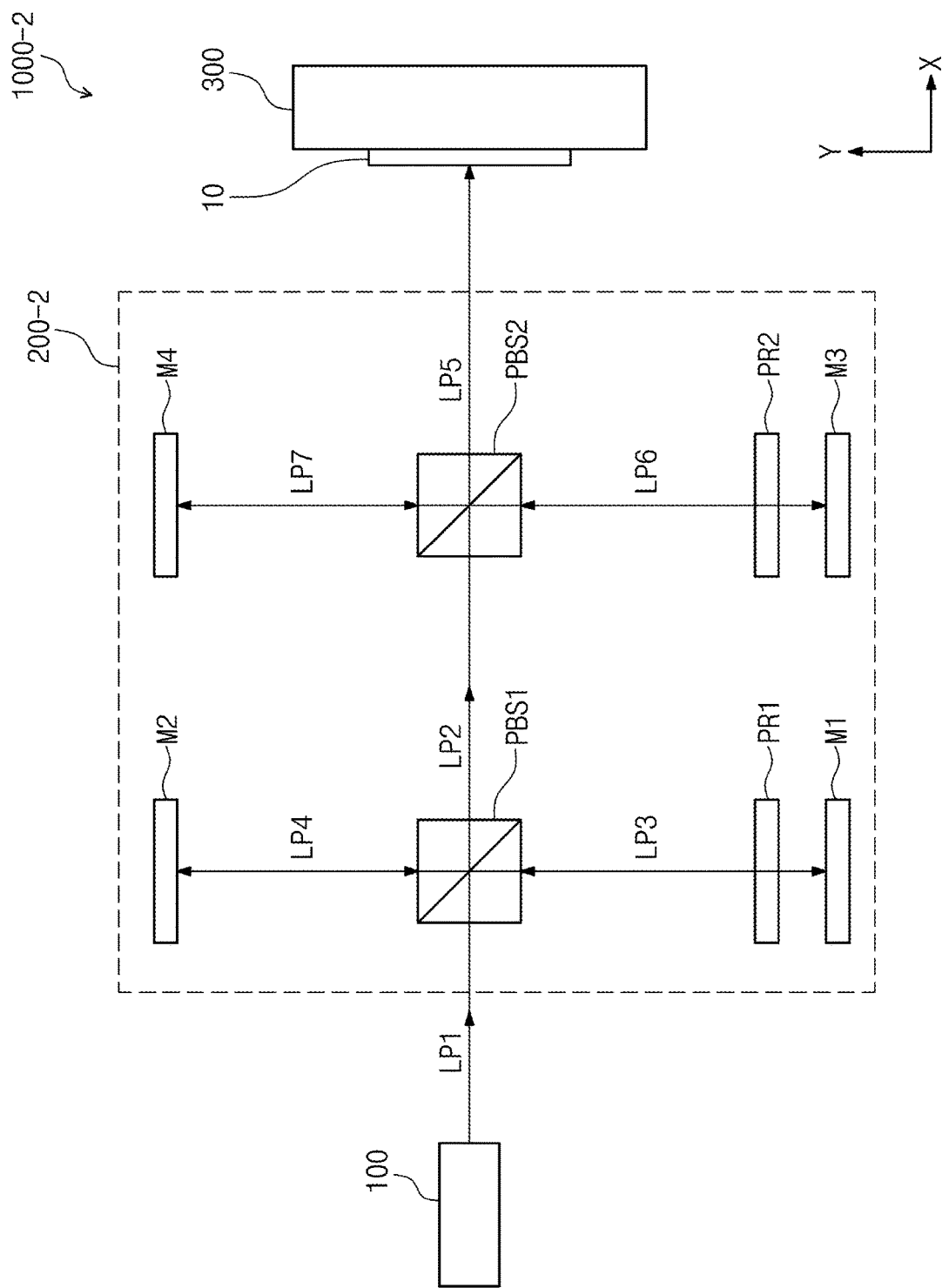
FIG. 10 is a schematic diagram illustrating an optical system according to still other embodiment of the inventive concept.
Figure 11:
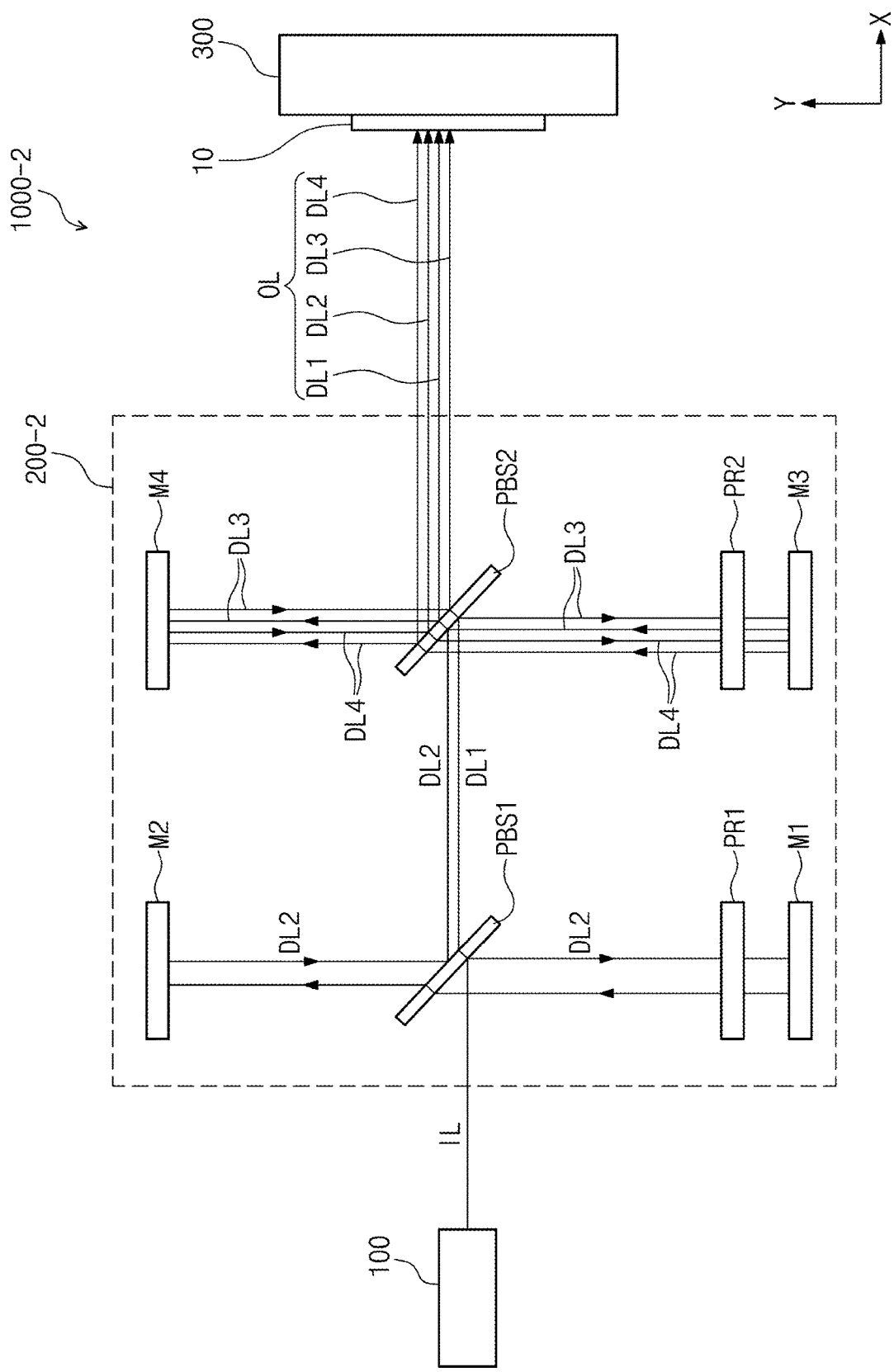
FIG. 11 is a diagram illustrating optical paths of lights passing through an optical system of FIG. 10.

FIG. 10 is a schematic diagram illustrating an optical system according to still another embodiment of the inventive concept, and FIG. 11 is a diagram illustrating optical paths of lights passing through an optical system of FIG. 10.

For concise description, a previously described element may be identified by a similar or identical reference number without repeating an overlapping description thereof. Other elements that are not separately described may be configured to have substantially the same technical features as those in the previously described embodiments.

Referring to FIGS. 10 and 11, an optical system 200-2 of a laser apparatus 1000-2 according to the present embodiment may include a plurality of beam splitters PBS1 and PBS2, a plurality of mirrors M2, and a plurality of phase retarders PR1 and PR2.

In the present embodiment, the input light IL may be a linearly-polarized light. As an example, the input light IL may be a solid laser. The input light IL may include P-polarized light and S-polarized light. Although not shown, in the case where the input light IL is an unpolarized light, the optical system 200-2 may further include a polarization modulator (not shown) disposed at the most front portion of the optical path. As an example, the polarization modulator may be a linear polarizer.

In the present embodiment, each of the beam splitters PBS1 and PBS2 may be a polarization beam splitter. Each of the beam splitters PBS1 and PBS2 may transmit or reflect an incident light depending on a polarization state of the incident light, and as a result, the incident light may be divided into a plurality of lights.

In detail, a first beam splitter PBS1 may be disposed at the most front portion of the optical system 200-2. The first beam splitter PBS1 may divide light, which is generated by the laser generator 100 and is incident thereto along a first path LP1, into lights DL1 and DL2 propagating along a second path LP2, which is parallel to an x direction, and along a third path LP3, which is parallel to a y direction and perpendicular to the x direction.

A first mirror M1 may be disposed on the third path LP3. The first mirror M1 may reflect the light DL2, which is reflected by the first beam splitter PBS1 to propagate along the third path LP3, toward the first beam splitter PBS1. The light DL2, which is reflected toward the first beam splitter PBS1, may pass through the first beam splitter PBS1 and may propagate a fourth path LP4 parallel to the y direction. The fourth path LP4 may be connected to the third path LP3 by the first beam splitter PBS1.

A second mirror M2 may be disposed to face the first mirror M1 in the y direction, with the first beam splitter PBS1 interposed therebetween. The second mirror M2 may reflect the light DL2, which passes through the first beam splitter PBS1 and propagates along the fourth path LP4, toward the first beam splitter PBS1. The light DL2 provided toward the first beam splitter PBS1 may be reflected to propagate along the second path LP2.

A second beam splitter PBS2 may be disposed behind the first beam splitter PBS1, on the second path LP2. The second beam splitter PBS2 may divide light, which is incident thereto along the second path LP2, into lights DL1, DL2, DL3, and DL4 propagating along a fifth path LP5 parallel to the x direction and along a sixth path LP6 parallel to the y direction.

A third mirror M3 may be disposed on the sixth path LP6. The third mirror M3 may reflect lights DL3 and DL4, which are reflected by the second beam splitter PBS2 to propagate along the sixth path LP6, toward the second beam splitter PBS2. The lights DL3 and DL4, which are reflected toward the second beam splitter PBS2, may pass through the second beam splitter PBS2 and may propagate along a seventh path LP7 parallel to the y direction. The seventh path LP7 may be connected to the sixth path LP6 by the second beam splitter PBS2.

A fourth mirror M4 may be disposed to face the third mirror M3 in the y direction, with the second beam splitter PBS2 interposed therebetween. The fourth mirror M4 may reflect the lights DL3 and DL4, which pass through the second beam splitter PBS2 and propagates along the seventh path LP7, toward the second beam splitter PBS2. The lights DL3 and DL4 provided toward the second beam splitter PBS2 may be reflected to propagate toward the stage 300.

The phase retarders PR1 and PR2 may include a first phase retarder PR1 and a second phase retarder PR2. The first phase retarder PR1 may be disposed between the first beam splitter PBS1 and the first mirror M1 and on the third path LP3. The second phase retarder PR2 may be disposed between the second beam splitter PBS2 and the third mirror M3 and on the sixth path LP6.

Each of the first and second phase retarders PR1 and PR2 may retard a component of an incident light. As an example, each of the first and second phase retarders PR1 and PR2 may be a quarter wave plate retarding a component of an incident light by $\lambda/4$, where $\lambda$ is a wavelength of the incident light.

In detail, the input light IL propagating along the first path LP1 may be divided by the first beam splitter PBS1 into a first divided light DL1, which propagates along the second path LP2, and a second divided light DL2, which propagates along the third path LP3.

A fraction of the first divided light DL1 propagating along the second path LP2 may pass through the second beam splitter PBS2 and may propagate along the fifth path LP5.

The second divided light DL2 propagating along the third path LP3 may be reflected by the first mirror M1, may pass through the first beam splitter PBS1 again, may propagate along the fourth path LP4, and then may be reflected by the second mirror M2.

Although not shown in the drawings, the second divided light DL2 may be reflected by the first mirror M1 and the second mirror M2 several times. In other words, the second divided light DL2 may pass through the first beam splitter PBS1 several times. Since the second divided light DL2 passes through the third path LP3, a phase of a component of the second divided light DL2 may be retarded several times by the first phase retarder PR1.

The second divided light DL2, which is reflected several times, may be reflected by the first beam splitter PBS1 and may propagate along the second path LP2.

Although, as described above, the second divided light DL2 may be divided into a plurality of sub lights several times, the second divided light DL2 is illustrated in FIG. 11 to pass through each of the third and fourth paths LP3 and LP4 (e.g., see FIG. 10) just one time, for convenience in illustration.

A fraction of the second divided light DL2 propagating along the second path LP2 may pass through the second beam splitter PBS2 and may propagate along the fifth path LP5.

A phase of the second divided light DL2 on the fifth path LP5 may be different from a phase of the first divided light DL1.

A remaining fraction of the first divided light DL1, which does not pass through the second beam splitter PBS2, may be reflected by the second beam splitter PBS2 to propagate along the sixth path LP6. The light propagating along the sixth path LP6 will be referred to as a third divided light DL3.

The third divided light DL3 propagating along the sixth path LP6 may be reflected by the third mirror M3 again, may pass through the second beam splitter PBS2, may propagate along the seventh path LP7, and then may be reflected by the fourth mirror M4.

Although not shown in the drawings, the third divided light DL3 may be reflected by the third mirror M3 and the fourth mirror M4 several times. In other words, the third divided light DL3 may pass through the second beam splitter PBS2 several times. Since the third divided light DL3 passes through the sixth path LP6, a phase of a component of the third divided light DL3 may be retarded several times by the second phase retarder PR2.

The third divided light DL3, which is reflected several times, may be reflected by the second beam splitter PBS2 and may propagate along the fifth path LP5.

Although, as described above, the third divided light DL3 may be divided into a plurality of sub lights several times, for convenience in description, the third divided light DL3 is illustrated in FIG. 11 to pass through each of the sixth and seventh paths LP6 and LP7 (e.g., see FIG. 10) just one time, for convenience in illustration.

A phase of the third divided light DL3 on the fifth path LP5 may be different from phases of the first divided light DL1 and the second divided light DL2.

A remaining fraction of the second divided light DL2, which does not pass through the second beam splitter PBS2, may be reflected by the second beam splitter PBS2 to propagate along the sixth path LP6. The light propagating along the sixth path LP6 will be referred to as a fourth divided light DL4.

The fourth divided light DL4 propagating along the sixth path LP6 may be reflected by the third mirror M3 again, may pass through the second beam splitter PBS2, may propagate along the seventh path LP7, and then may be reflected by the fourth mirror M4.

Although not shown in the drawings, the fourth divided light DL4 may be reflected by the third mirror M3 and the fourth mirror M4 several times. In other words, the fourth divided light DL4 may pass through the second beam splitter PBS2 several times. Since the fourth divided light DL4 passes through the sixth path LP6, a phase of a component of the fourth divided light DL4 may be retarded several times by the second phase retarder PR2.

The fourth divided light DL4, which is reflected several times, may be reflected by the second beam splitter PBS2 and may propagate along the fifth path LP5.

Although, as described above, the fourth divided light DL4 may be divided into a plurality of sub lights several times, for convenience in description, the fourth divided light DL4 is illustrated in FIG. 11 to pass through each of the sixth and seventh paths LP6 and LP7 (e.g., see FIG. 10) just one time, for convenience in illustration.

A phase of the fourth divided light DL4 on the fifth path LP5 may be different from phases of the first, second, and third divided lights DL1, DL2, and DL3. In other words, the first to fourth divided lights DL1-DL4 on the fifth path LP5 may have components whose phases are different from each other.

Figure 12:
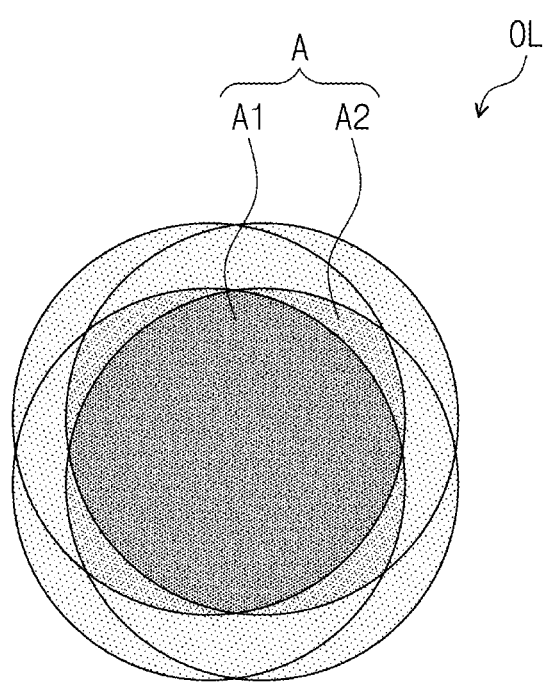
FIG. 12 is a cross-sectional view of an output light of FIG. 11.

FIG. 12 is a cross-sectional view of an output light of FIG. 11.

Referring further to FIG. 12, the first to fourth divided lights DL1-DL4 may be mixed with each other on the fifth path LP5. An area of the region 'A', which is defined as an overlapping region of the first to fourth divided lights DL1-DL4, may be larger than that in the previous embodiments.

In detail, the region 'A' may include a region 'A1' and a region 'A2'. The region A1 may refer to a region in which three or more divided lights are overlapped with each other, and the region A2 may refer to a region in which four or more divided lights are overlapped with each other.

In the present embodiment, since the divided lights DL1-DL4 propagate in a parallel manner without refraction between the beam splitters PBS1 and PBS2 and the mirrors M1 and M2, the propagation paths of the divided lights DL1-DL4 may be the same between the members PBS1, PBS2, and M1-M4. This may result in an increase of an overlapping area of the divided lights DL1-DL4, when viewed in a section of a beam. Consequently, a process precision may be improved, compared to the previous embodiment.

Figure 13:
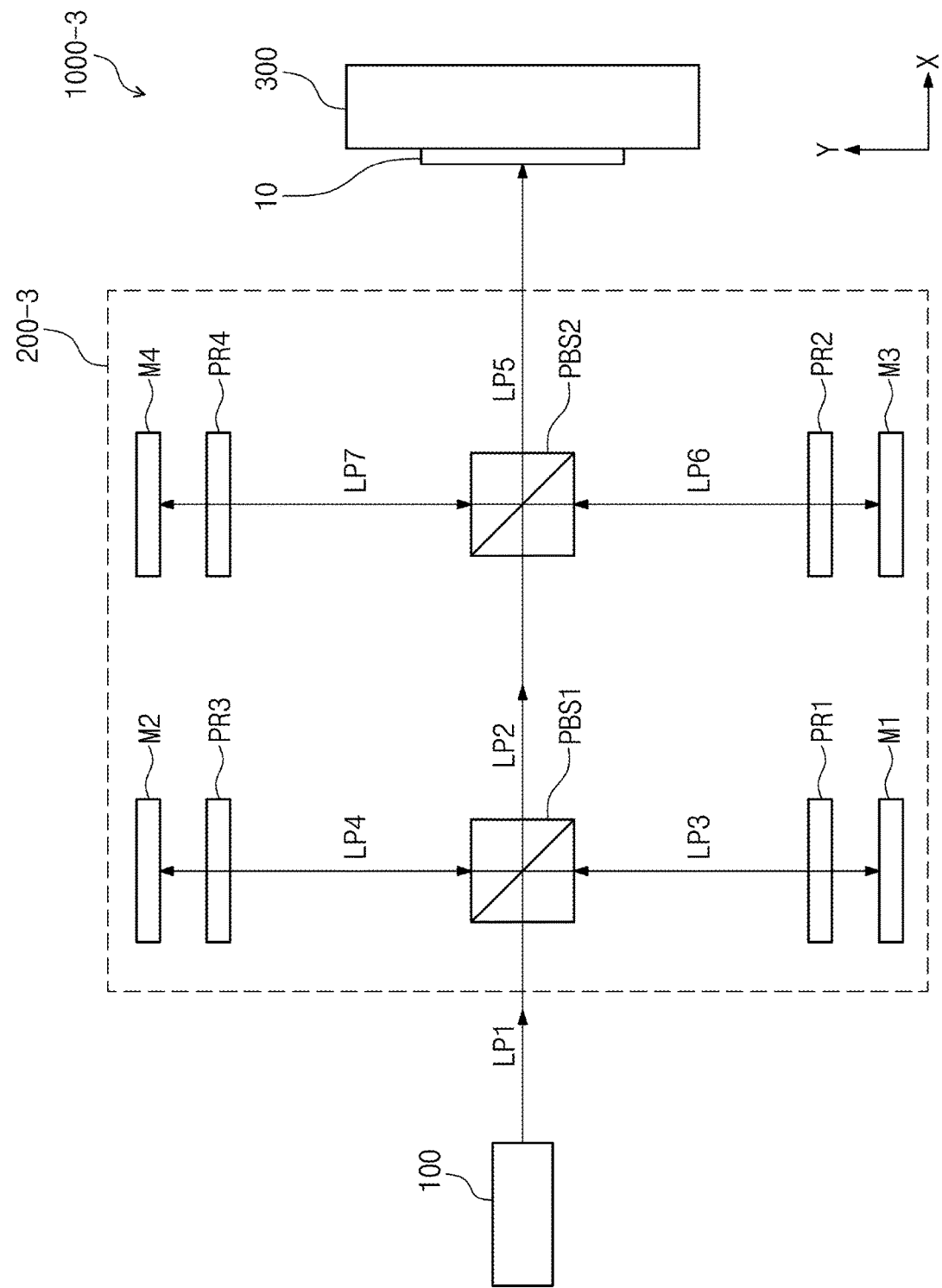
FIG. 13 is a schematic diagram illustrating an optical system according to yet other embodiment of the inventive concept.

FIG. 13 is a schematic diagram illustrating an optical system according to yet other embodiment of the inventive concept.

For concise description, a previously described element may be identified by a similar or identical reference number without repeating an overlapping description thereof. Other elements that are not separately described may be configured to have substantially the same technical features as those in the previously described embodiments.

Referring to FIG. 13, an optical system 200-3 according to the present embodiment may further include a third phase retarder PR3 and a fourth phase retarder PR4. The third phase retarder PR3 may be disposed between the first beam splitter PBS1 and the second mirror M2, on the fourth path LP4. The fourth phase retarder PR4 may be disposed between the second beam splitter PBS2 and the fourth mirror M4, on the seventh path LP7.

Each of the third and fourth phase retarders PR3 and PR4 may have a refractive index anisotropy. Each of the third and fourth phase retarders PR3 and PR4 may retard a component of an incident light. As an example, each of the third and fourth phase retarders PR3 and PR4 may be a quarter wave plate retarding a component of an incident light by $\lambda/4$, where $\lambda$ is a wavelength of the incident light. However, the inventive concept is not limited to the kind of the third and fourth phase retarders PR3 and PR4.

Figure 14:
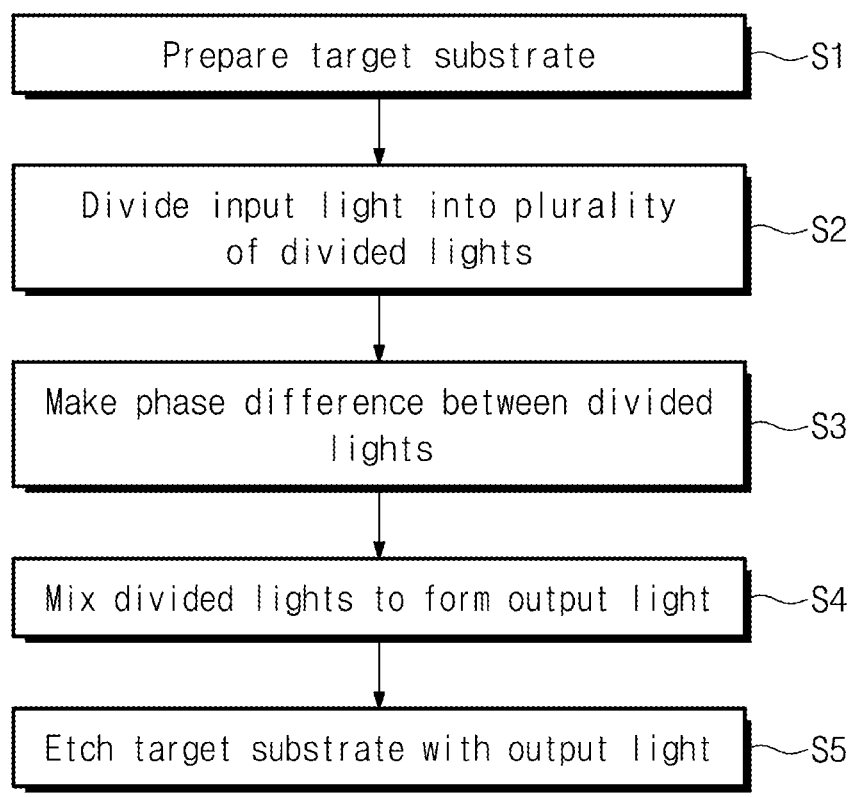
FIG. 14 is a flow chart illustrating a method of fabricating a display substrate, according to an embodiment of the inventive concept.

FIG. 14 is a flow chart illustrating a method of fabricating a display substrate, according to an embodiment of the inventive concept.

A substrate etching method according to an embodiment of the inventive concept may include preparing a target substrate corresponding to the target object 10 (in S1), dividing the input light IL into a plurality of divided lights DL (in S2), making a phase difference between the divided lights DL (in S3), mixing the divided lights DL whose phase are different from each other, to form the output light OL including a plurality of the pattern lights DFL (e.g., see FIG. 5) (in S4), etching at least a portion of the target substrate (e.g., the display substrate 10) with the output light OL (in S5).

According to an embodiment of the inventive concept, it may be possible to realize a high precision laser apparatus.

While example embodiments of the inventive concepts have been particularly shown and described, it will be understood by one of ordinary skill in the art that variations in form and detail may be made therein without departing from the spirit and scope of the attached claims.

What is claimed is:

1. A laser apparatus, comprising:
a laser generator generating at least one input light, wherein the input light is a laser beam;
an optical system converting the input light, which is provided from the laser generator, into an output light including a plurality of pattern lights; and
a stage, on which a target object is loaded, the output light being irradiated onto the target object,
wherein the optical system includes a light dividing part, a light condensing part, and a first processing part disposed on a focal point of the light condensing part and divides the input light into a plurality of divided lights having at least partially different phases,
the pattern lights are produced by constructive interference of the plurality of divided lights, and
a diameter of each of the pattern lights is smaller than a diameter of the input light.

2. The laser apparatus of claim 1, wherein the diameter of each of the pattern lights is smaller than or equal to about 1 μm.

3. The laser apparatus of claim 2, wherein
the light dividing part is configured to divide light that is incident thereto into the divided lights; and
the light condensing part is disposed behind the light dividing part on an optical path and configured to condense the divided lights in order to convert the divided lights into condensed lights.

4. The laser apparatus of claim 3, wherein the light dividing part comprises a diffraction optical element (DOE) that is configured to divide the incident light into the plurality of divided lights through diffraction of the incident light.

5. The laser apparatus of claim 3, wherein the light condensing part comprises at least one lens.

6. The laser apparatus of claim 3, wherein the first processing part is disposed behind the light condensing part on the optical path and configured to convert each of the condensed lights to a parallel light.

7. The laser apparatus of claim 6, wherein the optical system further comprises a second processing part disposed behind the light condensing part on the optical path and configured to change a shape and a size of the output lights.

8. The laser apparatus of claim 3, wherein the light condensing part comprises a material having a refractive index anisotropy.

9. The laser apparatus of claim 3, wherein at least two lights of the divided lights, which are divided by the light dividing part, are different from each other in terms of phase retardation values of specific components thereof.

10. A laser apparatus, comprising:
a laser generator generating at least one input light, wherein the input light is a laser beam;
an optical system converting the input light, which is provided from the laser generator, into an output light including a plurality of pattern lights; and
a stage, on which a target object is loaded, the output light being irradiated onto the target object,
wherein the optical system divides the input light into a plurality of divided lights having at least partially different phases,
the pattern lights are produced by constructive interference of the plurality of divided lights,
a diameter of each of the pattern lights is smaller than a diameter of the input light, and
wherein the optical system comprises:
a plurality of beam splitters, each of which are configured to transmit or reflect an incident light and divide the incident light into lights propagating in an x direction and in a y direction crossing the x direction;
a plurality of mirrors configured to reflect a light propagating in the y direction among the lights divided by the beam splitter; and
at least one phase retarder disposed between the beam splitter and the mirror on an optical path and configured to retard a phase of a component of the incident light.

11. The laser apparatus of claim 10, wherein the phase retarder comprises a quarter wave plate configured to retard a component of the incident light by λ/4, where λ is a wavelength of the incident light.

12. The laser apparatus of claim 10, wherein the optical system comprises:
   a first beam splitter configured to divide the input light, which propagates along a first path, into lights propagating along a second path parallel to an x direction and along a third path parallel to a y direction crossing the x direction;
   a first mirror disposed on the third path;
   a second mirror disposed on a fourth path to face the first mirror, the fourth path being parallel to the third path and being connected to the third path by the first beam splitter;
   a second beam splitter disposed on the second path, the second beam splitter configured to divide a light, which propagates along the second path, into lights propagating along a fifth path, which is parallel to the x direction and is directed toward the stage, and along a sixth path, which is parallel to the y direction;
   a third mirror disposed on the sixth path; and
   a fourth mirror disposed on a seventh path to face the third mirror, the seventh path being parallel to the sixth path and being connected to the sixth path by the second beam splitter.

13. The laser apparatus of claim 12, wherein the optical system further comprises:
   a first phase retarder disposed between the first beam splitter and the first mirror on the third path and configured to retard a phase of a component of an incident light; and
   a second phase retarder disposed between the second beam splitter and the third mirror on the sixth path and configured to retard a phase of a component of an incident light.

14. The laser apparatus of claim 12, wherein the optical system further comprises:
   a third phase retarder disposed between the first beam splitter and the second mirror on the fourth path and configured to retard a phase of a component of an incident light; and
   a fourth phase retarder disposed between the second beam splitter and the fourth mirror on the seventh path and configured to retard a phase of a component of an incident light.

15. The laser apparatus of claim 12, wherein the beam splitter is a polarization beam splitter, which is configured to transmit or reflect an incident light, depending on a polarization state of the incident light.

16. The laser apparatus of claim 15, wherein the input light is a linearly-polarized light.

17. A method of etching a substrate, comprising:
   providing a target substrate;
   dividing an input light into a plurality of divided lights by a light dividing part;
   making at least partial phase difference between the divided lights by a light condensing part;
   mixing the divided lights to form an output light by a first processing part disposed on a focal point of the light condensing part; and
   etching the target substrate using the output light,
   wherein, in the forming of the output light, the divided lights are constructively interfered with each other to form a plurality of pattern lights constituting the output light, and
   a diameter of each of the pattern lights is smaller than a diameter of the input light.

18. The method of claim 17, wherein the diameter of each of the pattern lights is smaller than or equal to about 1 μm.

19. The method of claim 18, wherein, in the dividing of the input light, the input light is divided into the plurality of divided lights through diffraction of the input light.

20. The method of claim 18, wherein, in the dividing of the input light, the input light is divided into the plurality of divided lights, depending on a polarization state of the input light.

* * * * *